United States Patent
Young et al.

(10) Patent No.: US 10,651,459 B2
(45) Date of Patent: May 12, 2020

(54) NICKEL HYDROXIDE COMPOSITE MATERIAL FOR ALKALINE RECHARGEABLE BATTERY

(71) Applicant: BASF Corporation, Florham Park, NJ (US)

(72) Inventors: Kwo Young, Troy, MI (US); William C. Mays, Commerce, MI (US); Lixin Wang, Waltham, MA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/370,756

(22) Filed: Dec. 6, 2016

(65) Prior Publication Data

US 2017/0194634 A1    Jul. 6, 2017

Related U.S. Application Data

(60) Provisional application No. 62/274,820, filed on Jan. 5, 2016.

(51) Int. Cl.
*H01M 4/32* (2006.01)
*H01M 4/62* (2006.01)
(Continued)

(52) U.S. Cl.
CPC ........... *H01M 4/32* (2013.01); *C01G 53/006* (2013.01); *H01M 4/28* (2013.01); *H01M 4/362* (2013.01); *H01M 4/52* (2013.01); *H01M 4/626* (2013.01); *C01P 2002/85* (2013.01); *C01P 2004/03* (2013.01); *C01P 2004/04* (2013.01); *C01P 2004/32* (2013.01); *C01P 2004/61* (2013.01);
(Continued)

(58) Field of Classification Search
None
See application file for complete search history.

(56) References Cited

U.S. PATENT DOCUMENTS

| 5,498,403 A | 3/1996 | Shin |
| 6,228,535 B1 | 5/2001 | Fierro et al. |

(Continued)

FOREIGN PATENT DOCUMENTS

| EP | 1744387 A2 | 1/2007 |
| EP | 2662914 A2 | 11/2013 |
| JP | H0982319 | * 3/1997 |

OTHER PUBLICATIONS

JPH0982319 English translation. Tadokoro et al. Japan. Mar. 1997 (Year: 1997).*

(Continued)

*Primary Examiner* — Christopher P Domone
(74) *Attorney, Agent, or Firm* — Dinsmore & Shohl LLP; Weston R. Gould (57) ABSTRACT

Provided are uniquely structured electrochemically active particles characterized by a first electrochemically active material and a second electrochemically active material disposed about the first material whereby at least the second material includes a modifier present as a continuous transition concentration gradient from the first material into the second material whereby the concentration is lower in the first material than the second material. Also provided are processes of producing the particle and electrochemical cells incorporating the particles as a positive electrode material in a cathode.

19 Claims, 8 Drawing Sheets

(51) Int. Cl.
*H01M 4/52* (2010.01)
*H01M 4/28* (2006.01)
*H01M 4/36* (2006.01)
*C01G 53/00* (2006.01)
*H01M 4/02* (2006.01)

(52) U.S. Cl.
CPC ....... *C01P 2006/11* (2013.01); *C01P 2006/12* (2013.01); *C01P 2006/14* (2013.01); *H01M 2004/021* (2013.01)

(56) References Cited

U.S. PATENT DOCUMENTS

| | | | | |
|---|---|---|---|---|
| 6,416,903 | B1* | 7/2002 | Fierro | H01M 4/32 429/218.1 |
| 6,517,802 | B1 | 2/2003 | Xiao et al. | |
| 2005/0221179 | A1* | 10/2005 | Baeuerlein | C01G 53/00 429/223 |
| 2010/0102282 | A1 | 4/2010 | Malcus et al. | |
| 2014/0356713 | A1 | 12/2014 | Sun et al. | |
| 2017/0133668 | A1* | 5/2017 | Kim | C01G 53/50 |

OTHER PUBLICATIONS

JPH0982319 Abstract. Tadokoro et al. Japan. Mar. 1997 (Year: 1997).*
International Search Report and Written Opinion for corresponding PCT Application No. US2016/065155 dated Mar. 13, 2017.
Huang G. et al, "Core-shell ellipsoidal MnCo204 anode with micro-/nano-structure and concentration gradient for lithium-ion batteries," ACS Applied Materials and Interfaces, 2014, vol. 6, No. 23.
Hall D.S. et al, "Nickel hydroxides and related materials: a review of their structures, synthesis and properties"; Proc. R. Soc. A. 2015, vol. 471.
Hall, David S. et al.; Proc. R. Soc. A; 2015; 471:20140792.
Huang, G. et al.; American Chemical Society Applied Materials & Interfaces; 2014; vol. 6; pp. 21325-21334.
Wang, C.Y. et al.; Journal of Alloys and Compounds; 2002; vol. 330-332; pp. 802-805.

* cited by examiner

NICKEL HYDROXIDE COMPOSITE MATERIAL FOR ALKALINE RECHARGEABLE BATTERY

CROSS REFERENCE TO RELATED APPLICATIONS

This application depends from and claims priority to U.S. Provisional Application No. 62/274,820, filed Jan. 5, 2016, the entire contents of which are incorporated herein by reference.

FIELD

This disclosure relates to metal hydroxide/oxyhydroxide materials and methods for their fabrication. In particular, the disclosure relates to metal hydroxide/oxyhydroxide alloy materials that are capable of performing oxidation/reduction electrochemically.

BACKGROUND

Nickel hydroxide or compositionally modified nickel hydroxide is known to be used as cathode active material for a number of alkaline rechargeable batteries including Ni—Zn, Ni—Cd, Ni—$H_2$, and Ni/MH batteries. Among these batteries, Ni/MH battery has the highest energy density. However, current Ni/MH batteries lose market share in portable electronic devices and the battery-powered electrical vehicle markets to the rival Li-ion technology due to limited gravimetric energy density (<110 Wh $kg^{-1}$). As such, the next generation of Ni/MH batteries is geared toward improving two main targets: raising the energy density and lowering cost.

As with electrode formation, the properties of nickel hydroxide also differ widely depending upon the production method used. Generally, nickel hydroxide is produced using a precipitation method in which a nickel sulfate and a solution are mixed together followed by the precipitation of nickel hydroxide. The resulting particles are typically of uniform constitution throughout the particle material, but may be of relatively lower packing density limiting their use.

In order to produce high density, substantially spherical particles, nickel hydroxide crystals are grown relatively gradually under carefully controlled process conditions. A nickel salt was grown in an environment stabilized by an ammonium ion. The nickel salt forms complex ions with ammonia to which a strong base is added. The nickel hydroxide is then gradually precipitated by decomposition of the nickel ammonium complex. One drawback of this general method is that the reaction rate is difficult to control, so tailoring methods have been introduced to separate critical reaction steps in the production process to compensate for said difficulties. For example, U.S. Pat. No. 5,498,403, entitled "Method for Preparing High Density Nickel Hydroxide Used for Alkali Rechargeable Batteries", issued to Shin on Mar. 12, 1996, discloses a method of preparing nickel hydroxide from a nickel sulfate solution using a separate or isolated amine reactor. Nickel sulfate is mixed with ammonium hydroxide in the isolated amine reactor to form nickel ammonium complex. The nickel ammonium complex is removed from the reactor and sent to a second mixing vessel or reactor where it is combined with a solution of sodium hydroxide to obtain nickel hydroxide. Such a method relies heavily on a raw material source of very high purity.

Another method of producing nickel hydroxide particles results in a multi-layered particles such as particles of a core-shell structure whereby an electrochemically active core is surrounded by an active outer layer. The outer layer may have a three dimensional structure that will allow sufficient ion conduction to allow ions to reach the inner active particle material. An example of particles with this structure is found in U.S. Pat. No. 6,416,903. Methods of making such core/shell structures can be achieved using one or more reactors whereby an active seed is first formed and then subjected to a second precipitation reaction to create a second material disposed about the seed. In this way, particles can be created whereby the shell material will impart improved cycle life and the core will impart high-temperature performance to the overall material.

While these and other methods of forming core/shell particles for metal hydride battery systems, there remains a need for improved capacity of the resulting materials while maintaining or improving cycle life. As will be explained herein below, the present invention addresses these needs by providing new materials that may be made in a single stage reactor and have properties improved over traditional core/shell particles. These and other advantages of the invention will be apparent from the drawings, discussion, and description which follow.

SUMMARY

The following summary is provided to facilitate an understanding of some of the innovative features unique to the present alloys and is not intended to be a full description. A full appreciation of the various aspects of the alloys can be gained by taking the entire specification, claims, drawings, and abstract as a whole.

The production of electrochemically active materials suitable for battery use requires generation of materials with desirable capacity and cycle life. Recent efforts have led to the production of core/shell structured materials. While these materials have improved prior shortcomings, those generated previously still are less than optimal. As such, it is a first object to provide an electrochemically active particle that can be used as an active in an electrochemical cell. The provided particles have a unique structure and element concentration gradient that allows tailoring of particle characteristics such as electrochemical performance, structure, or other, with the absence of a discrete boundary between differing materials provided in the particle. A particle includes: a first electrochemically active material, and a second electrochemically active material disposed about the first electrochemically active material, the second electrochemically active material including one or more single element modifiers, the modifier(s) present as a continuous transition concentration gradient from said first electrochemically active material into the second electrochemically active material, and the modifier(s) concentration being lower in the first electrochemically active material than in the second electrochemically active material, and wherein the atomic percentage of constituent elements excluding the modifier of the first electrochemically active material and the second electrochemically active material differ by less than 20 atomic percent. Optionally, the modifier is a metallic element, the metallic element different from all of the constituent elements within the particle. The first electrochemically active material and the second electrochemically active material optionally include a metallic constituent, optionally as a predominant. Optionally, the metallic constituents of the first electrochemically active material and the second electrochemically active material are identical other than the presence of the modifier. Optionally, the first electrochemically active material and the second electrochemically active material comprise nickel as a metallic predominant constituent element. In some aspects, the first electrochemically active material and the second electrochemically active material comprise nickel and cobalt as predominant or exclusive constituent elements. A modifier is optionally selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn. A modifier, in some aspects, is optionally not Co or Mn. Optionally, the atomic ratio of modifier at the surface of the particle relative to the first electrochemically active material is from about 10:1 to about 1.2:1. A particle may have a unique surface area that differs structurally than the structure of the first electrochemically active material. Optionally, the particle has a BET surface area of 40 $m^2/g$ or greater. In some aspects, the second electrochemically active material comprises a plurality of surface pores extending from an outer most portion of the second electrochemically active material toward the first electrochemically active material. Pores may be interacting so as to form a plurality of interconnected channels. In some aspects, the plurality of surface pores have an average pore diameter of less than 35 angstroms, optionally less than 25 angstroms. Optionally, the plurality of surface pores has a pore volume (optionally on average) of 0.02 cc/g or greater, optionally 0.025 cc/g or greater. In some aspects, the percentage of pores with an area of 15 angstroms or less is 5 percent or greater.

It is another object to provide an electrochemically active particle with high surface area to provide improved cycling ability and discharge capacity. As such, an electrochemically active particle is provide that includes: a first electrochemically active material; and a second electrochemically active material disposed about the first electrochemically active material; the particle having a BET surface area of 40 $m^2/g$ or greater. It is appreciated that some aspects of the provided particles include one or more of the characteristics of a particle as described above, optionally including but not limited to the second electrochemically active material including one or more single element modifiers, the modifier(s) present as a continuous transition concentration gradient from said first electrochemically active material into the second electrochemically active material, and the modifier(s) concentration being lower in the first electrochemically active material than in the second electrochemically active material, and wherein the atomic percentage of constituent elements excluding the modifier of the first electrochemically active material and the second electrochemically active material differ by less than 20 atomic percent. An electrochemically active particle optionally includes a plurality of surface pores extending from an outer most portion of the second electrochemically active material toward the first electrochemically active material, the particle having an average pore diameter of less than 35 angstroms, optionally less than 25 angstroms. Optionally, the plurality of surface pores has a pore volume of 0.02 cc/g or greater, optionally 0.025 cc/g or greater. Optionally, the percentage of pores with an maximum cross sectional dimension (diameter in the case of a sphere) of 15 angstroms or less is 5 percent or greater. A particle optionally has a tap density of 1.5 g/cc or less, optionally 1 g/cc or less.

Another object is to provide a process for forming electrochemically active particles in a single tank reactor including: simultaneously combining one or more metal salts with a conductive modifier and a solvent in a single reactor to form a combination, the modifier having a solubility lower than the metal salts in the solvent; agitating the combination; and adding a base to the combination to precipitate the electrochemically active particle. A process is optionally performed exclusive of initiating the precipitation reaction upon a preformed seed particle. A process optionally includes maintaining the pH within the tank to a level of 9.0 to 11.0, optionally 9.0 to 10.7. In some aspects, a base is added to the reaction at a substantially constant rate. A base is optionally NaOH or KOH. A base is optionally added from a solution of 15% to 25% and at a rate of 3 cc/min or less. Optionally, ammonia is added to the reactor, optionally at a molar ratio to salt (e.g. metal salt reactant) of less than 7, optionally less than 2. A reaction temperature is optionally maintained at 20° C. to 100° C. The reaction is optionally agitated, optionally continuously agitated, by mixing using a propeller rotating at a rate of 400-1000 rpm. In some aspects, the metal salt and the conductive modifier are added to the reactor in from a single feed stream. The processes are optionally performed to produce any of the claimed particles.

These and additional features provided by the aspects described herein will be more fully understood in view of the following detailed description, in conjunction with the drawings.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings in which:

DETAILED DESCRIPTION

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "electrochemically active" is intended to mean that the material functions in the absorption or desorption of an ion such as a proton, Li$^+$, Na$^+$, or Mg$^{2+}$, accompanied by the electron in and out from the outside circuitry during electrochemical cycling.

Provided are particulate materials and methods of their production that are useful as active materials in battery electrodes. The methods provided allow for the formation of these particulate battery actives that have the benefits of traditional core/shell particles in being able to tailor particular characteristics into different regions of the particles, but are able to be manufactured in a single stage reactor system. The resulting particles have unique surface microstructure that improves capacity of the material whereby that improved capacity is able to be maintained over a high number of cycles.

The provided particles have a unique structure characterized by an absence of discrete layers throughout the particle radius or depth. Thus, unlike traditional core/shell systems, the provided particles vary from one material identity to a second material identity with a continuous gradient of material change of at least one element thereby avoiding the discrete layering in which differences between layers are observable on a microscopic level as opposed to an atomic level.

As such, an electrochemically active material is provided that includes a first electrochemically active material and a second electrochemically active material that differ in composition by at least one modifier and whereby a second electrochemically active material substantially surrounds the first electrochemically active material but there is no discrete compositional or physical layer boundary. Instead, the particles are characterized by a continuous transition from a first material to a second material. At least the second material includes one or more single element modifiers whereby the concentration of the modifier increases from a lower concentration toward the center of the particle to a higher concentration at or near the particle surface. A modifier is provided in elemental form such as by formation of the particle in the presence of the modifier during a growth phase of a coprecipitation reaction under appropriate conditions as described below.

The continuous gradient of modifier concentration from the core (first material) to the outer shell (second material) may be complemented by a unique outer layer microstructure characterized by a high surface area (as optionally measured by BET) combined with a higher overall pore volume but larger percentage of small pores (<15 Å pore diameter) than was achieved previously. This results in some aspects in a material with an improved overall capacity created by the shell while improved cycle life may be promoted by the stable core structure.

The provided particle(s) has a first electrochemically active material and a second electrochemically active material disposed substantially about the first material, optionally totally surrounding the first material. The first material is an inner material and the second active material is an outer material relative to the first material. Thus, the terms "inner" and "outer" refer to the relative positioning of the first and second materials relative to each other and the center of the particle and not necessarily to the relative positioning about the particle.

The second material is disposed about the first material and may completely surround the first material. The second material may be the outer-most material of the particle, which encapsulates or substantially encapsulates the first material. The second material may form a composite particle of two different active materials that are in contact with one another. In contrast to prior core/shell type particles that include a discrete layer adjacent to a first material, the second material of the presently provided particle represents a continuous transition from the first material to or through the second material whereby the transition is a transition in composition, structure, form, combinations thereof, or other. It is noted that discrete layers are layers that form an identifiable boundary on a microscopic as opposed to atomic level. The absence of such a discrete layer in the present particle structurally distinguishes the presently provided particles from prior materials. The inner material and the outer material substantially form a solid solution whereby the boundary between active materials may be a graded concentration or a diffusion of compositions.

The particles are provided by the incorporation of a modifier within at least the second electrochemically active material. A modifier serves to electrochemically, structurally, or both, alter the particle characteristics to provide improved characteristics, optionally capacity or cycle life. A modifier is optionally present in a second material, a first material or both, with the proviso that the concentration of the modifier at the surface of the particle or within the second material is greater than the concentration of the modifier at the core or within the first material.

A modifier is optionally present at a concentration of 15 atomic percent or less relative to other transition metal components that form the particle. Optionally the maximum concentration of the modifier is at or less than 14 atomic percent, 13 atomic percent, 12 atomic percent, 11 atomic percent, 10 atomic percent, 9 atomic percent, 8 atomic percent, 7 atomic percent, 6 atomic percent, 5 atomic percent, 4 atomic percent, 3 atomic percent, 2 atomic percent, or 1 atomic percent.

The concentration of the modifier increases, optionally continuously, optionally with continuous concentration gradient, toward the surface of the particle relative to the core. The increasing relative concentration of the modifier modestly lowers the relative concentration of one or more other elemental constituents of the material. For example, an increasing concentration of a modifier reduces the concentration of an electrochemically active constituent. However, excluding the modifier, the concentration of the other constituents is appreciated to differ by at or less than 20 atomic percent from the core within the first electrochemically active material to the outer surface of the second electrochemically active material, in some aspects where the outer surface of the second electrochemically active material is distal from the core relative to the first electrochemically active material. Optionally, the concentration of other constituents excluding the modifier differs between the first material and the outer surface of the second material by 20 atomic percent or less, optionally 19 atomic percent or less, optionally 18 atomic percent or less, optionally 17 atomic percent or less, optionally 16 atomic percent or less, optionally 15 atomic percent or less, optionally 14 atomic percent or less, optionally 13 atomic percent or less, optionally 12 atomic percent or less, optionally 11 atomic percent or less, optionally 10 atomic percent or less, optionally 9 atomic percent or less, optionally 8 atomic percent or less, optionally 7 atomic percent or less, optionally 6 atomic percent or less, optionally 5 atomic percent or less, optionally 4 atomic percent or less, optionally 3 atomic percent or less, optionally 2 atomic percent or less, optionally 1 atomic percent or less.

A modifier is optionally a metal, optionally a metal in a form and of a type that does not appreciably inhibit particle growth of the constituent elements of the particle. A modifier optionally has a larger atomic radius than all other constituents within the particle. Without being limited to one particular theory, it is believed that the presence of the modifier alters the crystal structure of the resulting material leading to stability of more active phases and structural changes in the material that impart beneficial electrochemical characteristics thereto. As a non-limiting example, the presence of the modifier is believed to stabilize the alpha/gamma phase of nickel hydroxide such that the second material includes a stabilized alpha/gamma-NiOOH material that is capable of more than one electron transfer thereby resulting in a material with a larger capacity relative to other, unstabilized materials.

A modifier is optionally a metal. A metal is optionally selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn. In some aspects a modifier is selected from the group consisting of Co, Zn, Mg, Ca, Mn, Cu, Fe, and Al. One or more modifiers may be present. Optionally, two or more modifiers are present. Optionally, three or more modifiers are present. Optionally, one to three modifiers are present at least within the second electrochemically active material whereby the modifier(s) is selected from the group consisting of Co, Zn, Mg, Ca, Mn, Cu, Fe, and Al. In some aspects, Mg is not a modifier. In some aspects, Co is not a modifier. In some aspects, Mn is not a modifier.

A modifier is optionally present in a continuous concentration gradient from the first material to the particle surface such that the atomic percentage of modifier is greater at the surface than in the first material. Optionally, the ratio of atomic percent of the modifier at the particle surface relative to the first electrochemically active material is from about 10:1 to 1.2:1 or any value or range therebetween. The atomic percent of modifier at the surface is optionally at or more than 1.2 times greater than in the first electrochemically active material, optionally 1.3 times greater, optionally 1.5 times greater, optionally 2 times greater, optionally 3 times greater, optionally 4 times greater, optionally 5 times greater, optionally 6 times greater, optionally 7 times greater, optionally 8 times greater, optionally 9 times greater, optionally 10 times greater.

In some aspects a constituent element in a first and second material is or includes nickel. Optionally, a constituent is selected from the group consisting of Ni, Co, Mn, Mg, or others. Optionally, a constituent element is limited to Ni alone or Ni combined with Co. As such, particular aspects have the composition of $Ni_xCo_yM_zOH_a$ where $x+y+z=100$ and a is sufficient to satisfy the chemical requirements of the formula, and M is one or more modifiers as described herein. In some aspects, x is 50 atomic percent or greater, optionally 60 atomic percent or greater, optionally 70 atomic percent or greater, optionally 80 atomic percent or greater, optionally 82 atomic percent or greater, optionally 85 atomic percent or greater, optionally 90 atomic percent or greater, where the atomic percent is given as the overall atomic percent metal in the particle. In some aspects, Ni is a metallic predominant including the presence of a modifier.

Illustrative examples of compositions of overall composite materials include, but are not limited to $(Ni,Co,Zn)(OH)_2$, $(Ni,Co)(OH)_2$, $(Ni,Co,Al)(OH)_2$ and $(Ni,Co,Zn,Al)(OH)_2$. In some aspects, nickel hydroxide active composite materials include $(Ni,Co,Al)(OH)_2$ where Ni is present from about 75 at % to about 95 at % or from about 80 at % to about 90 at % and Co and Al together are from about 5 at % to about 25 at % or from about 10 to about 20 at %, based on 100 at % total of Ni, Co and Al combined. For instance, Ni is optionally about 81 at %, about 82 at %, about 83 at %, about 84 at %, about 85 at %, about 86 at %, about 87 at %, about 88 at %, or about 89 at %. Optionally, Co and Al combined are about 11 at %, about 12 at %, about 13 at % about 14 at %, about 15 at %, about 16 at %, about 17 at %, about 18 at %, or about 19 at %, based on 100 at % total of Ni, Co and Al.

Optionally, in the exemplary illustrative materials that include Ni, Co, and Al, the atomic ratio of Co to Al is for example from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1. For example, the atomic ratio of Co to Al is from about 4:1 to about 1:1 or from about 3:1 to about 1:1.

Optionally, the first and second materials have compositions that are significantly different yet somewhat similar. By making the inner material composition different from the outer material composition by a small but significant amount, electrochemical properties of the inner material may be enhanced without degradation of aggregate electrochemical properties. For example, an outer material may be formulated with an outer composition or structure to maximize a first property, such as high capacity, and the inner material may be formulated with a second composition to maximize a second property, such as high cycle life. Thus, a nickel hydroxide particle may have a first electrochemical property or characteristic primarily defined by the first or outer material and a second electrochemical property or characteristic primarily defined by the first material or a combination of the first and second materials.

The particles as provided herein may be in the form of spheres or spheroids. The substantially particles are for example substantially spherical, for instance micron scaled spheres. The particles have an effective diameter (or other maximum cross-sectional distance) for instance from about 0.1 microns to about 100 microns on average, from about 1 micron to about 80 microns, from about 2 microns to about 60 microns, from about 3 microns to about 50 microns, from about 4 microns to about 40 microns, from about 5 microns to about 30 microns, or from about 5 microns to about 20 microns on average.

For instance the nickel hydroxide active materials are optionally in the form of spherical particles with an average effective diameter of from about 1 to about 10 microns, from about 5 to about 20, from about 10 to about 15, from about 3 to about 8 microns or from about 3 to about 5 microns. The particulate collected from a certain process may be sieved, crushed, or otherwise altered from a pristine state to arrive at the desired particle size such as effective diameter.

In the present core-shell particles, the shell may cover the entire core or partially cover the core. For example, the shell may be a continuous or discontinuous layer on the core. The shell may cover greater than or equal to 10%, greater than or equal to 20%, greater than or equal to 30%, greater than or equal to 40%, greater than or equal to 50%, greater than or equal to 60%, greater than or equal to 70%, greater than or equal to 80% or greater than or equal to 90% of the core.

Particles have a three dimensional structure within the second material and/or at the particle surface that is substantially porous. Optionally, a particle may have a plurality of channels extending from an outer-most portion to an inner or inner-most portion of the second material for providing ion transport between an electrolyte and the first or inner active material. The channels may be any shape, including circular, oblong, asymmetrical, etc. The channels preferably have an average pore diameter (or other maximum cross-sectional dimension) of 35 angstroms or less, optionally 32 angstroms or less, optionally 31 angstroms or less, optionally 25 angstroms or less. Thus, the channels extend from an outer surface of an outer active material to the inner active material through a plurality of interconnected passage ways and are a size (e.g. diameter) suitable for providing ion transport between an electrolyte and the inner material.

The provided particles have an unexpectedly high percentage of small pores relative to the total pore volume of the material. Optionally, the percentage of pores with a diameter (or other maximum cross sectional dimension) of 15 angstroms or less is 1 percent or greater, optionally 2 percent or greater, optionally 3 percent or greater, optionally 4% or greater, optionally 5% or greater. The higher small pore percentage provides a fluffy appearance to the particle material and results in a higher overall capacity than previously achieved.

The average total pore volume of the particles is optionally 0.017 cc/g or greater, optionally 0.02 cc/g or greater, optionally 0.025 cc/g or greater.

The porous structure to the material results in a higher BET surface area than prior particles. A BET surface area is optionally 40 $m^2/g$ or greater. In some aspects, the BET surface area is 45 $m^2/g$ or greater, optionally 50 $m^2/g$ or greater.

A particle has a tap density that is optionally 1.5 g/cc or less, optionally 1.4 g/cc or less, optionally 1.3 g/cc or less, optionally 1.2 g/cc or less, optionally 1.1 g/cc or less, optionally 1.0 g/cc or less, optionally 0.9 g/cc or less. In some aspects a particle has a tap density of 1.5 g/cc or less and a BET surface area of 40 $m^2/g$ or greater.

It is appreciated that some aspects include particles with a plurality of the foregoing characteristics. Optionally, a particle has a BET surface area of 40 $m^2/g$ or greater, a pore density of greater than 0.02 cc/g and a high fine pore percentage with the percentage of pores with a pore diameter (or other maximum cross-sectional dimension) of less than 15 angstroms being 5% or greater.

Production of particles with the claimed structure and excellent electrochemical properties is achieved by tailored manufacturing techniques. In some aspects, a particle is formed by a modification of the continuously stirred single tank reactor of U.S. Pat. No. 6,416,903. It was found that by a simultaneous combination of one or more metal salts (e.g. constituent salts) with a modifier in a solvent whereby the modifier has a solubility lower than the metal salts in the solvent and with agitation and adding a base, optionally at a constant rate, a single stage reaction can be achieved that preferentially precipitates the constituent metals at a nucleation stage to form a first material and whereby continual particle growth results in increased incorporation of the modifier into the structure during or throughout the growth phase. The increased incorporation of the modifier and the relatively lower pH of the process results in the unique surface structure of the resulting particles. Thus, a single stage, single reactor system is used to achieve the provided particles.

A process of producing a particle in a single take reactor by a single step process includes simultaneously combining one or more metal salts, optionally metal sulfate or nitrate, with a conductive modifier, and a solvent in a single reactor to form a combination, the modifier having a solubility lower than the metal salts in the solvent, agitating the combination, and adding a base to the combination whereby the agitation and base addition are continued for a residence time suitable for the production of a particle as provided herein. The process is achieved without the inclusion of a seed particle formed either in the same or a separate reactor. This means that all constituents and modifier are simultaneously combined upon initiation of the precipitation reaction in the single reactor thereby negating preformation of a seed in a separate reaction step.

A solvent used in the precipitation reaction is any suitable solvent as recognized in the art. Non-limiting examples include water, optionally purified or deionized water, ethanol, or other.

In some aspects, ammonia is added to the reactor. By controlling the liquid phase and vapor phase of the ammonia in the reactor system careful control of the precipitation reaction is achieved leading to gradually increasing concentrations of modifier in the particle during growth. The ammonia is optionally included such that the ammonia to salt ratio in the reaction is significantly lower than prior methods. Optionally, the ammonia is added at a molar ratio to salt of less than 7, optionally less than 6, optionally less than 5, optionally less than 4, optionally less than 3, optionally less than 2.

pH is a controlling factor in the system. Prior methods of controlling pH were performed by monitoring pH levels and adjusting the pH so as to maintain a desired pH of the system. In the present methods, base may be added at a substantially constant rate. This results in a system that has a pH of 9.0 to 11.0. Optionally, pH is 9.0 to 10.7. It was found that by utilizing a pH of less than 11, improved particle characteristics could be achieved. This was particularly true at a pH of 10.7 or less. While it is possible to maintain this pH by adjusting the rate of base material, when excluding the seed aspect from the reaction system and simultaneously adding the constituent metal salts and the modifier, adjusting the rate of base addition was unnecessary, such that the new process resulted in a unique particle. The addition of a base such as KOH or NaOH may be used. Optionally, 15-25 wt % KOH, NaOH, or combination thereof is used. Suitable rates of addition are optionally 3 cc/min or less, optionally 2 cc/min or less where the addition rates are for a 300 ml reactor volume. The rates may be adjusted for larger or smaller reaction volumes as appropriate.

The temperature of the mixture in the reactor should be maintained at the temperatures a desired reaction temperature, optionally 20-100° C. or any value or range therebetween. In some aspects, reaction temperature is 30-80° C., optionally 40-50° C.

In order to assure optimum contact between the components of the mixture introduced into the reactor, constant mixing or agitation may be provided. Mixing may be provided by any suitable method, such as stirring, agitating, vortexing or ultrasonic mixing. In an exemplary aspect, a reaction is stirred, optionally at a rate of 400-1000 rpm, or any value or range therebetween. In some aspects, the reaction is stirred at 500-900 rpm, optionally 700-800 rpm. Other agitation methods may be used to achieve similar amounts of agitation to that produced by stirring at the provided rates.

In some aspects, the constituent metal is included in the system as a metal sulfate. A first solution is created by solubilizing the metal sulfate or multiple metal sulfates as well as a modifier optionally from a nitrate form in an aqueous solvent, optionally water. This is then pumped into a reaction chamber along with a base and an ammonia buffer at the desired concentration and at a desired rate so as to control the ammonia liquid and vapor phases. The chamber is continuously agitated for a reaction time at a reaction temperature and resulting pH. Small crystallites with no or very low levels of modifier are formed at the bottom of the chamber as a result of the relatively low solubility of the modifier in $Ni(OH)_2$ at the nucleation stage. It believed that this is the result of the relatively larger atomic radius of the modifier compared to nickel or other constituents. During the growth stage wherein the particles are brought up to the surface by the agitation condition during the movement of the crystallites up in the reactor, the modifier is more readily precipitated so as to be deposited at higher concentrations into the growing particle. The resulting particles are carried out by overflow from the reactor into a storage chamber. The resulting product may be rinsed with solvent, such as water, and dried by suitable drying technique, optionally air drying.

Without being limited to one particular theory, it is believed that the modifier element promotes the formation of gamma phase NiOOH during over charging. The gamma phase contributes to higher capacity of the resulting material. The lower level of modifier, or absence thereof, in the first material promotes maintenance of beta phase which results in maintenance of the integrity of the particle and increased cycle life. The result is a particle with high capacity and excellent cycle life.

Metals of $MeSO_4$ and/or $MeNO_3$ in this process optionally include Ni and one or more modifiers for instance selected from Co, Zn, Mg, Cu, Mn, Al, Bi, Cr, Fe, In, La, Y (and other rare earths), Ru, Sb, Sn, Ti, Ba, Si and Sr. $MeNO_3$, if desired, includes metals such as Ca, Al, or combinations thereof.

The $MeSO_4$ solution is formulated by mixing from about 3 to about 30 weight percent (wt %), from about 5 to about 25 wt % of from about 7 to about 12 wt % $NiSO_4$ with other sulfate solutions containing the desired metal(s). Overall, the metal sulfate solution added to the reactor is from about 0.5 to about 10 M (molar), from about 1 M to about 7 M or from about 2 M to about 5 M. The $NH_4OH$ solution added to the reactor is from about 2 M to about 30 M, from about 5 M to about 20 M or from about 8 M to about 15 M. The NaOH solution added to the reactor is from about 5 wt % to about 50 wt %, from about 8 wt % to about 40 wt % or from about 15 wt % to about 30 wt %. Deionized water is optionally employed as a solvent in the solutions.

In order to incorporate Ca, Al, or other modifier, into the bulk of an exemplary nickel hydroxide active material, a separate solution of $M(NO_3)_2$, $CaCl_2$ or the like may be prepared and introducing the solution to the reactor independently. The modifier solutions may be from about 0.5 wt % to about 20 wt %, from about 2 wt % to about 15 wt % or from about 11 wt % to about 18 wt % metal solutions in water.

The particles as provided herein may be used as an active in an electrode for an electrochemical cell, optionally a secondary electrochemical cell. In some aspects, an electrode incorporating the active particles is employed in a cell as a positive electrode. The positive electrode composition in some aspects includes a nickel hydroxide particulate material and optionally one or more components selected from binders and additives. Illustrative examples of an additive include cobalt compounds, zinc compounds, rare earth compounds or carbon materials. Carbon materials are illustratively graphite, graphene, cokes or carbon black.

The active particles may be employed into electrodes that are optionally sintered, foamed, or pasted. Sintered positive electrodes may be constructed by applying a nickel powder slurry to a nickel-plated steel (or other) base followed by sintering at high temperature. This process causes the individual particles of nickel to weld at their points of contact resulting in a porous material that is approximately 80% open volume and 20% solid metal. This sintered material is then impregnated with active material such as that including an active particle as provided herein.

Pasted electrodes may include active particles as provided herein in electrochemical contact with a conductive substrate and can be made by dry-paste without binder or wet-paste with binder. Pasted electrodes are simple to manufacture, for instance by applying a paste comprising active particles to a conductive substrate, followed by roll pressing.

A conductive substrate may be any electrically conductive support for an electrode active material. It may be in the form of a foam, grid, screen, mesh, matte, plate, fiber, foil, expanded metal or any other type of support structure. It may take the form of conventional nickel foils, plates and foams, as well as carbon networks, fibers or particulate and cobalt oxyhydroxide networks. It may be made from any electronically conductive material, for example nickel, nickel alloys, copper and copper alloys. For instance, the conductive substrate is nickel, a nickel alloy, nickel plated steel or nickel plated copper. For example the conductive substrate is a nickel foam.

Binders may be any suitable binder. Illustrative binders include polymeric binders such as, but not limited to polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinylidene chloride, polyvinylidene fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable.

The binder may be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrilebutadiene-methyl acrylate copolymer.

The positive electrode compositions include from about 75 to about 99.8 weight percent (wt %) electrode active material, from about 0.2 to about 10 wt % polymeric binder and from 0 to about 24.8 wt % additives, based on the weight of the electrode composition.

The positive electrode compositions include an appropriate viscosity thickener. Thickeners are for instance cellulosic polymers, salts thereof, polyacrylic acid or polymethacrylic acid or salts thereof and the like. Thickeners may be present in the electrode composition at a level of from about 0.2 wt % to about 1.5 wt %, based on the weight of the composition.

A paste may be a dry paste, comprising the electrode composition and no solvent. Alternatively, the paste may contain the components of the electrode composition and a solvent selected from water, organic solvents and combinations thereof.

Solvents include for instance water and organic solvents such as N-methylpyrrolidone, xylene, toluene, acetone, methanol, ethanol, i-propanol, n-propanol, methylethylketone, cyclohexane, heptane, hexane, tetrahydrofuran and the like.

After a paste slurry is applied (pasted) to a conductive substrate, it is typically dried to remove the solvent. The slurry may be allowed to dry at room temperature or may be dried at temperatures up to for instance about 60° C., 70° C., 80° C. or 90° C. Drying may be performed in an oven. The minimum time required for drying is that which results in complete removal of water and/or organic solvent.

After pasting and drying, the electrode may be formed in a press mold or with a roll press or calendar or similar device to achieve the final desired thickness (pressing step). An optional thickness is for instance from about 21 mil to about 33 mil.

When used in an electrochemical cell as a positive active electrode material, the cell also includes a negative electrode, a casing having the electrodes positioned therein, a separator separating the negative and positive electrodes, and a suitable electrolyte in contact with the electrodes.

The negative electrode (anode) for example is appropriately matched and is optionally a metal hydride (MH) alloy capable of reversibly charging and discharging hydrogen. The active material of an MH alloy may include an ABx type alloy capable of storing hydrogen where x is from about 0.5 to about 5.5. A is a hydride forming element and B is a weak or non-hydride forming element. The alloys are capable of reversibly absorbing and desorbing hydrogen. Suitable alloys are for instance taught in U.S. Pat. Nos. 4,623,597, 5,096,667, 5,536,591, 5,840,440, 6,270,719, 6,536,487, 8,053,114, 8,124,281, 7,829,220, 8,257,862 and 8,409,753 and U.S. Pub. Nos. 2013/0277607 and 2006/057019.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

Particles are produced in a 300 ml continuously stirred reaction chamber substantially as described in U.S. Pat. No. 6,416,903 with modifications to reactant addition, pH and ammonia control. A first exemplary set of particles are formed with the final atomic composition of $Ni_{86.4}Co_{11.5}Al_{2.1}(OH)_2$. Metal sulfates of Ni and Co are combined with $Al(NO_3)_3$ in water at relative amounts of 85.7 wt % $NiSO_4$, 11.4 wt % $CoSO_4$, and 2.9 wt % $Al(NO_3)_3$. These amounts may be adjusted to alter the overall particle composition. The reactants are pumped into the reaction chamber at 0.1 mol/hr along with NaOH (20 wt % solution in water, at 1.8 cc/min) and $NH_3$ (29.9 wt % in water, at 0.17 mol/hr). The reaction chamber is continuously stirred with a mixer speed of 750 revolutions per minute (RPM). The pH of the system is monitored each day for four reaction days. The resulting pH was 10.66, 10.65, 10.40, and 10.25 for days 1-4 respectively. The fully grown crystals are collected from an overflow in a storage container. The particles are washed with NaOH and air dried.

The resulting material is denoted WM12. Several physical and electrochemical characterizations are performed. The resulting particles are analyzed for overall metal composition using a Varian Liberty 100 inductively-coupled plasma (ICP) system. The resulting material had a composition of $Ni_{86.4}Co_{11.5}Al_{2.1}(OH)_2$. Numerous other compositions are formed as above and will be illustrated below.

Similar procedures are performed in the same reactor using slightly modified conditions (90.3 wt % $NiSO_4$, 5.0 wt % $CoSO_4$, and 5.5 wt % $Al(NO_3)_3$) and whereby pH is adjusted by continuous adjustment of NaOH rates to a target pH of 12.2 and with significantly greater ammonia flow rates. The ammonia was flowed at a rate of 0.7 mol/hr and the NaOH flow rate averaged 3.3 cc/min. The resulting pH profiles of the reactor at days 1-4 respectively were 11.47, 11.39, 11.28, and 11.21. This resulted in a system with significantly higher reaction pH and a much higher ammonia to salt ratio (7 in the comparator relative to 1.7 in the WM12 system). All other parameters remained the same. The resulting particle had an ICP composition of $Ni_{91}Co_5Al_4$ and is referred to as WM02.

Figure 1:
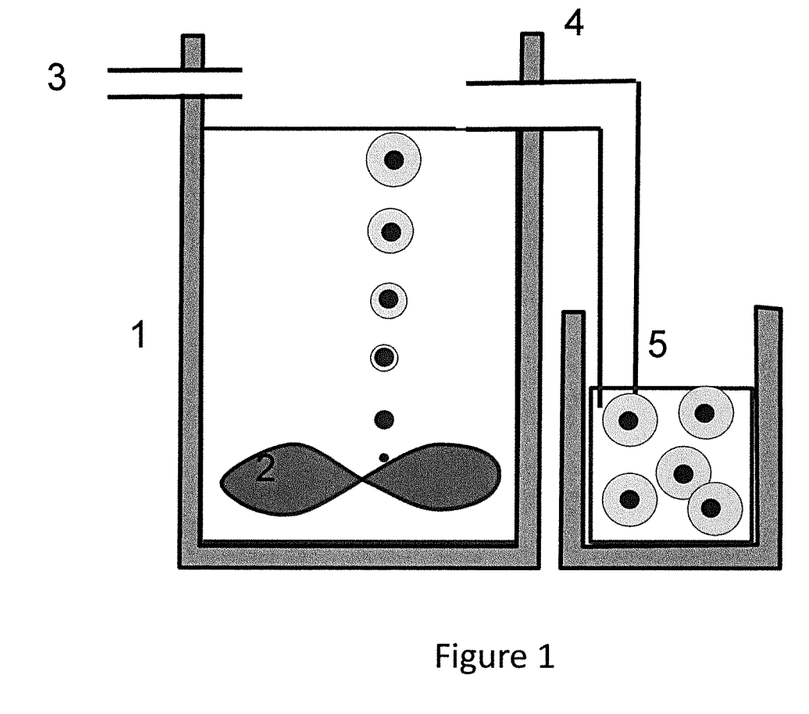
FIG. 1 illustrates a schematic continuously stirred reactor and the production of particles according to aspects described herein and exemplifying a single stage process whereby particle nucleation and particle growth of a compositionally different outer material are achieved.
Figure 2:
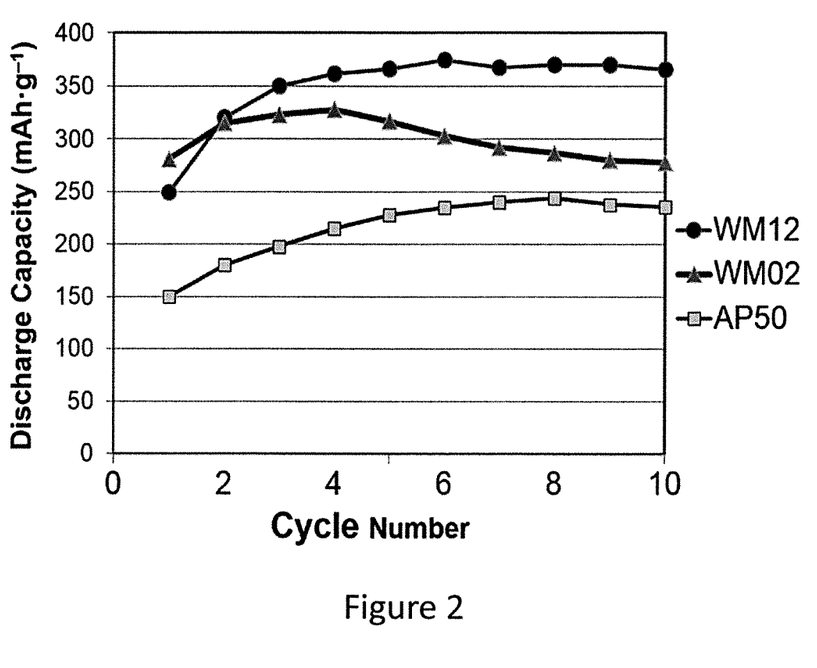
FIG. 2 illustrates discharge capacity of three comparative materials.

For electrochemical measurements, 100 mg of active particles are combined with carbon black and polyvinylidene fluoride (PVDF) at a ratio of 3:2:1 to prepare a positive electrode material. The slurry is applied to a 0.5×0.5 inch nickel mesh with a nickel mesh tab for electrical connection. The electrode is pressed under 3 tons of pressure for 5 seconds. A cell is constructed with a negative electrode made from dry compacted $AB_5$ type alloy where the electrodes are sandwiched together with a polypropylene/polyethylene separator in a flooded half-cell configuration. The resulting design is a positive limited design by the negative electrode capacity being much higher than the positive electrode capacity. Electrochemical testing is performed in an Arbin electrochemical testing station (Arbin Instrument, College Station, Tex., USA). The testing is compared to a second control of pure beta structure nickel hydroxide material with the composition $Ni_{90}Zn_{4.5}CO_{4.5}$ denoted AP50 in the following studies. Cycling performance of the three materials charged and discharged at currents of 25 mA/g with a charge of 18.5 hours are illustrated in FIG. 2 and capacity calculations are based on the weight of the active material. Both WM02 and WM12 show a higher discharge capacity than AP50. WM02 has a higher initial capacity, but also a more severe degradation in capacity relative to WM12.

Figure 3A:
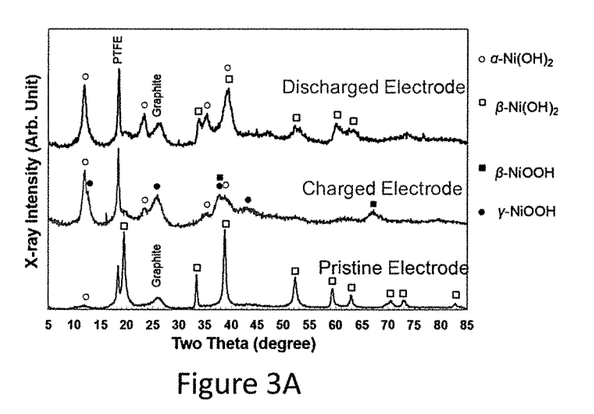
FIG. 3A illustrates XRD patterns using Cu-Kα as the radiation source for material WM02.
Figure 3B:
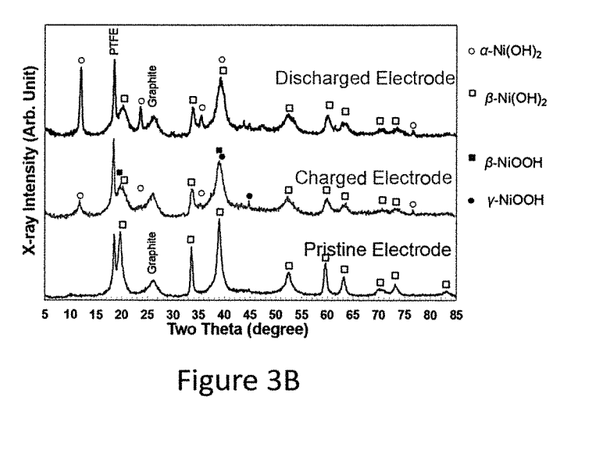
FIG. 3B illustrates XRD patterns using Cu-Kα as the radiation source for material WM12.

The materials are further studied by XRD using a Philips X'Pert Pro X-ray diffractometer (Philips, Amsterdam, Netherlands) and the generated patterns fitted and peaks indexed by the Jade 9 software (Jade Software Corp. Ltd.; Christchurch, New Zealand). Results are depicted in FIGS. 3A for WM02 and 3B for WM12. The results show that both WM12 and WM02 begin with a beta structure which is converted to an alpha structure predominant and an alpha/beta mixed state, respectively.

Figure 4A:
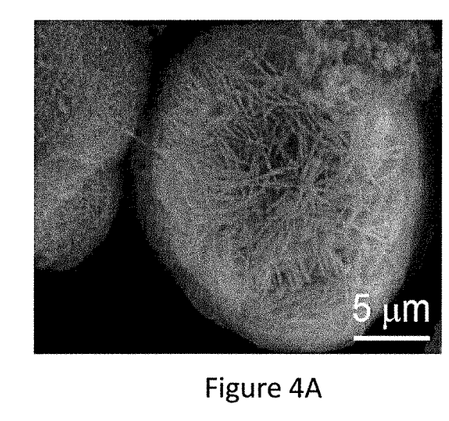
FIG. 4A is a scanning electron micrograph of a particle according to aspects of the disclosure exhibiting an Al modifier present at a continuous concentration gradient from a first material through a second material and exhibiting sufficient alpha structure.
Figure 4B:
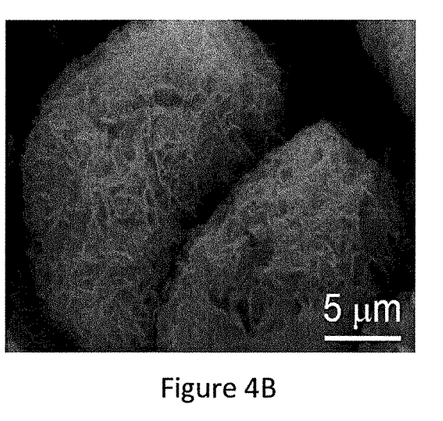
FIG. 4B is a scanning electron micrograph of a particle according to aspects of the disclosure exhibiting an Al modifier present at a continuous concentration gradient from a first material through a second material and exhibiting sufficient alpha structure following 20 cycles.
Figure 4C:
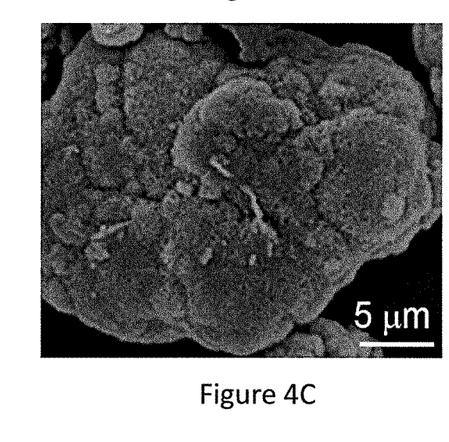
FIG. 4C is a scanning electron micrograph of a control particle exhibiting insufficient alpha structure.
Figure 4D:
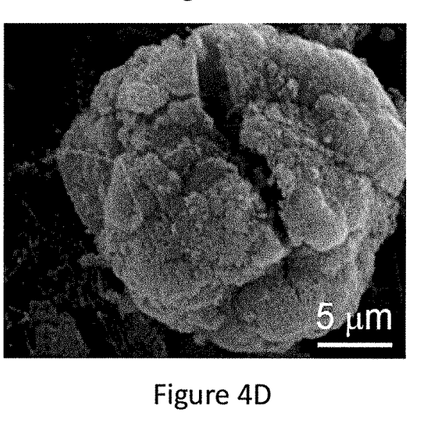
FIG. 4D is a scanning electron micrograph of a control particle exhibiting uniform alpha structure following 20 cycles demonstrating cracking representative of insufficient resistance to swelling from a beta to alpha transition.

Particle topologies before and after electrochemical cycling are studied by SEM using a JEOL-JSM6320F scanning electron microscope (SEM, JEOL, Tokyo, Japan) with energy dispersive spectroscopy (EDS) with corresponding micrographs illustrated in FIGS. 4A and 4B respectively for WM12 and FIGS. 4C and 4D respectively for particles WM02. The WM12 particles show maintenance of the particle structure during cycling. In contrast the WM02 particles show cracking due to swelling caused by the beta to alpha transition. Interestingly, the particle morphologies are quite distinct between WM02 and WM12. The WM02 particles have a more compact surface with a cauliflower like texture. The WM12 particles, in contrast, have a much lower density at the surface with the crystallite plates aligning perpendicular to the surface.

Figure 4E:
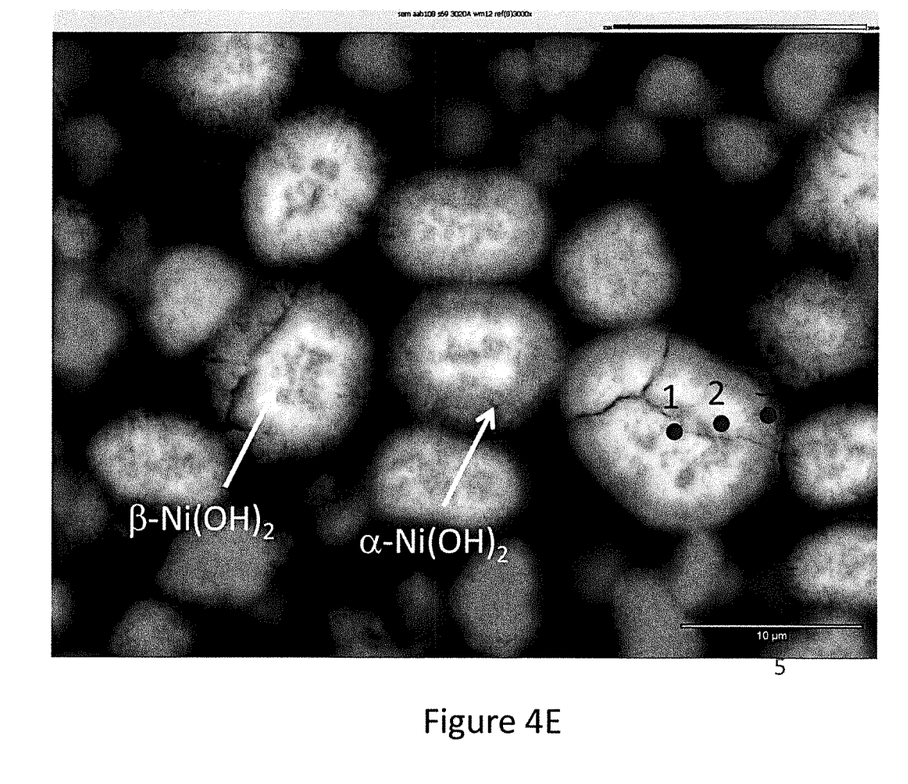
FIG. 4E is a back scanning SEM image of an exemplary material according to aspects of this disclosure demonstrating unique compositional and structural differences from first material (core) to second material (shell)

Cross-section SEM backscattering electron images of activated WM12 at different magnification are shown in FIG. 4E. EDS analyses of the spots illustrated in the figure representing different regions within the particle demonstrate a surface region with higher Al-content than the core region. The elemental composition (atomic percent) of the material at the various regions are illustrated in Table 1.

TABLE 1

|  | Al | S | Co | Ni |
| --- | --- | --- | --- | --- |
| Spot 1 | 1.6 | 1.1 | 11.4 | 86.0 |
| Spot 2 | 2.5 | 1.6 | 11.9 | 84.0 |
| Spot 3 | 4 | 1.5 | 13 | 81.5 |

Figure 4F:
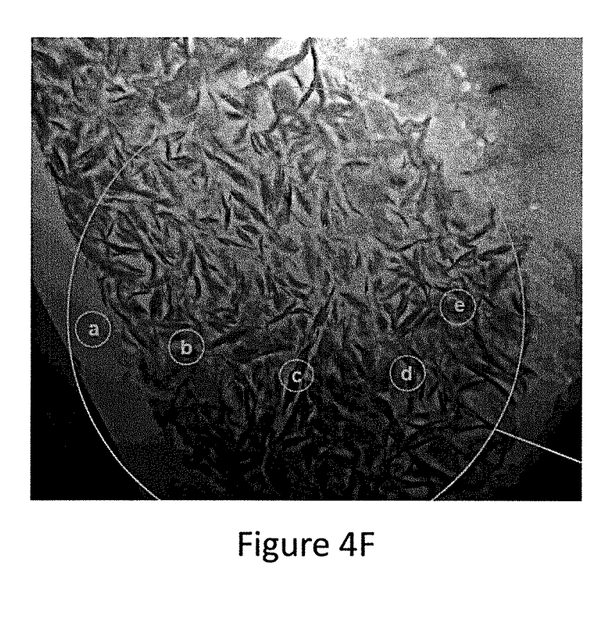
FIG. 4F is a representative TEM image of a particle according to aspects as provided herein.
Figure 4G:
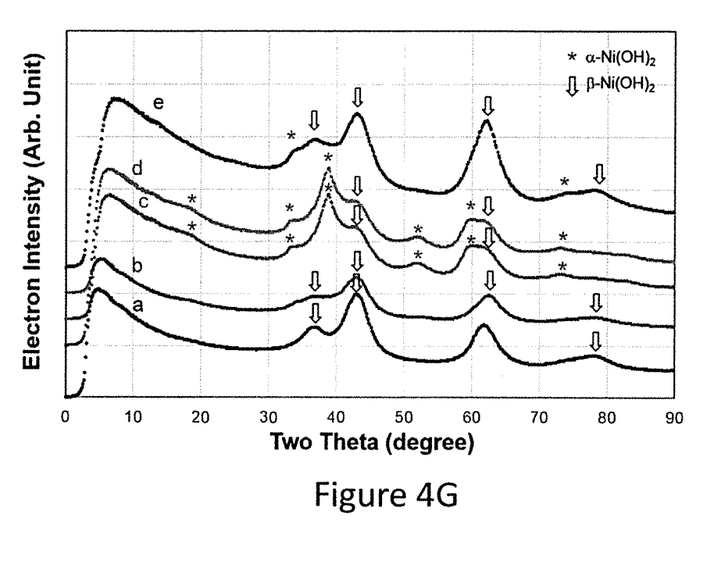
FIG. 4G is the representative integrated diffraction electron density information of the spots listed in FIG. 4F.

Microstructure studies of the particles is performed by TEM using an FEI Titan 80-300 (scanning) transmission electron microscope (TEM/STEM, Hillsboro, Oreg., USA). Mechanical polishing was used with thin samples followed by ion milling. A representative image is illustrated in FIG. 4F. The integrated electron diffraction intensities were collected from the diffraction pattern for areas (a)-(e). For the convenience of comparison between the TEM and XRD results, the distance in reciprocal space obtained from TEM electron diffraction has been converted to a degree based system on the wave length of Cu Kα X-ray and the results are shown in FIG. 4G with the conversion to the standard XRD suing Cu Kα as the radiation source. Although the electron density plot is not identical to the XRD pattern due to different scattering factors between X-ray and electron beam, the main features can still be distinguished and areas (a)-(e) have been identified as β, β, β, β, and mixed α/β structures, respectively. These data indicate that the shell region of WM12 is composed of nano-sized α-$Ni(OH)_2$ imbedded in the β-$Ni(OH)_2$ matrix, which helps to distribute the stress from the lattice expansion in the α-β transition.

Two independently prepared samples of WM12 and a control sample of material with a pure beta nickel hydroxide structure (YRM3: $N_{0.93}Zn_{0.05}Co_{0.02}(OH)_2$) packaged in electrode material as above were subjected to different charge/discharge conditions as illustrated in Table 2.

TABLE 2

| Stage | Cycle Number | Charge Current | Charge Time | Discharge Current |
| --- | --- | --- | --- | --- |
| I | 1-65 | 25 | 18 | 150 |
| II | 66-95 | 50 | 7 | 150 |
| III | 96-105 | 75 | 6 | 150 |
| IV | 106-145 | 125 | 3 | 150 |
| V | 146-155 | 250 | 1.5 | 150 |
| VI | 155-180 | 300 | 1.5 | 150 |
| VII | 181-190 | 200 | 2 | 200 |
| VIII | 191-201 | 250 | 2 | 150 |
| IX | 201-end | 200 | 2 | 150 |

Figure 5:
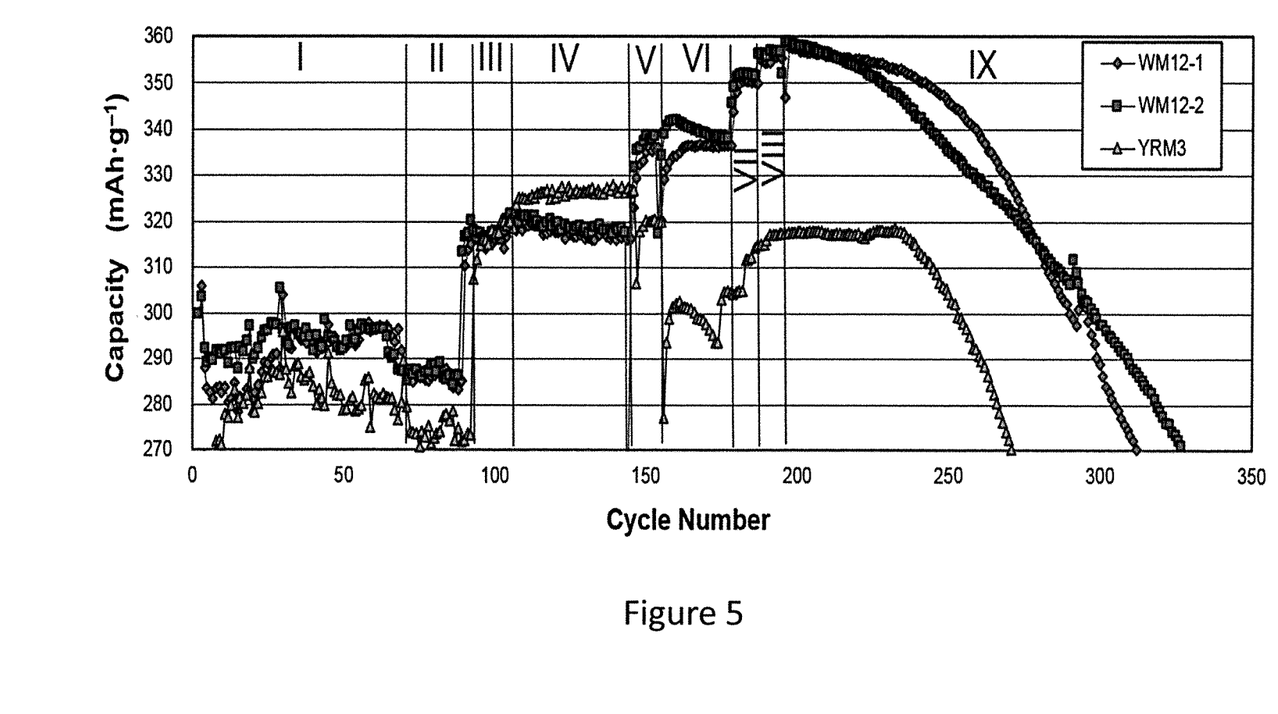
FIG. 5 illustrates half-cell capacity measurement of two α/β Ni(OH)$_2$ particles (WM12-1 and WM12-2) and one β-Ni(OH)$_2$ (YRM3 with a cation composition of N$_{93}$Zn$_5$Co$_2$) prepared according to aspects as provided herein with charge and discharge currents at 25 mA·g$^{-1}$ (charge for 18.5 h) wherein capacity calculations are based on the weight of the active material.
Figure 6:
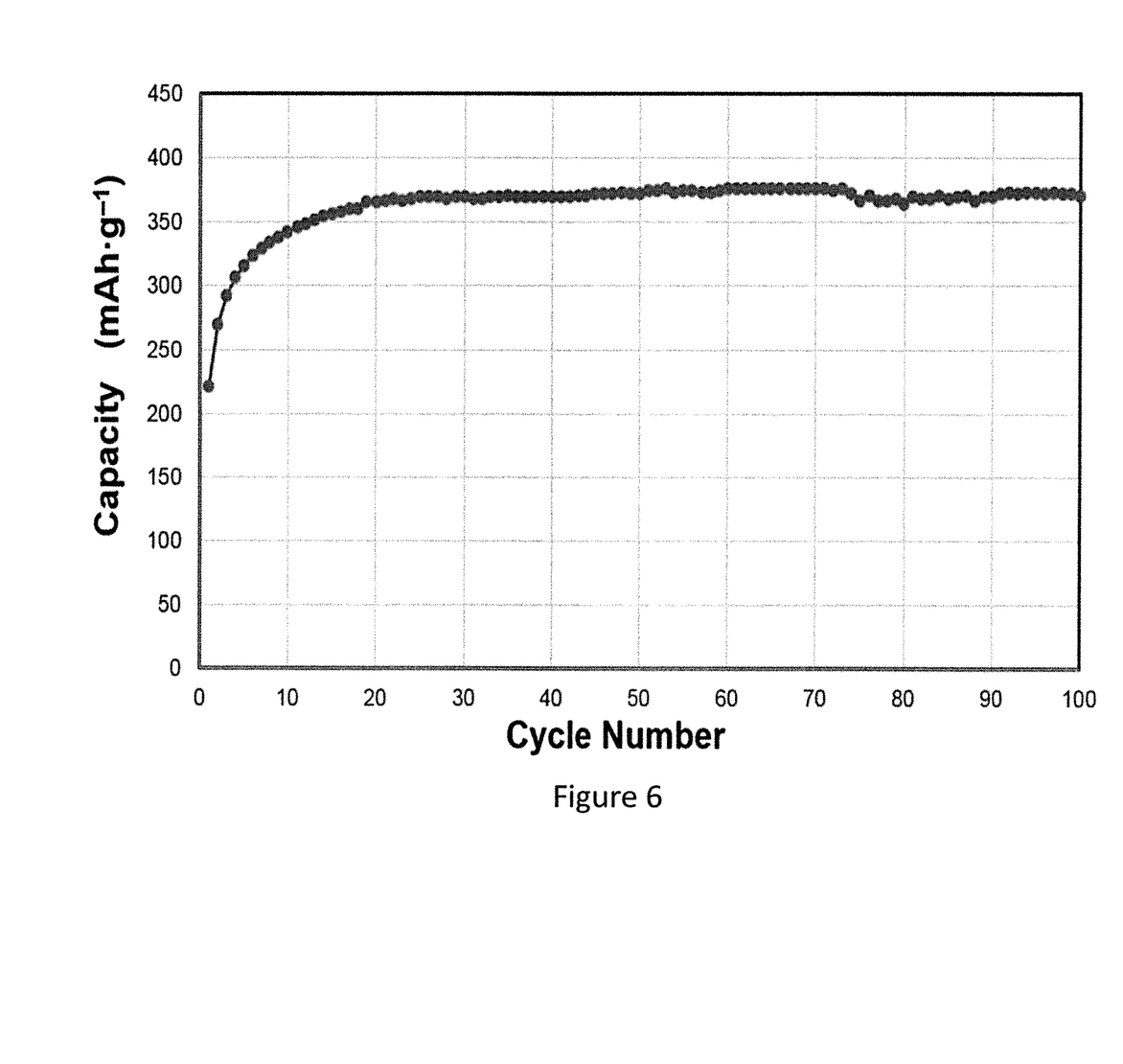
FIG. 6 illustrates discharge capacity of a material according to aspects provided herein illustrating excellent cycle stability.

The capacities obtained from the testing are illustrated in FIG. 5. The capacity of the WM12 particles are superior at all levels as well as exhibiting improved cycling stability. The WM12 materials were also subjected to half cell studies with a 100 mA·$g^{-1}$ rate charge for 5.5 h and discharging at the same rate. Results are illustrated in FIG. 6. Maximum capacity is observed at cycle 31 with a discharge capacity of 376 mAh·$g^{-1}$. It is clear that the capacity of the WM12 particles are well maintained well past the $100^{th}$ cycle, with the cycle 100 capacity remaining at 371 mAh·$g^{-1}$.

The overall performance of the WM02 single structure particle (no core/shell structural differences) compared to WM12 particles with the structural changes from core to outer surface are illustrated in Table 3.

TABLE 3

| Parameter and properties | WM02 | WM12 |
|---|---|---|
| Target Composition | $Ni_{0.91}Co_{0.05}Al_{0.04}(OH)_2$ | $Ni_{0.84}Co_{0.12}Al_{0.04}(OH)_2$ |
| Tap Density | 1.4 g·cc$^{-1}$ | 0.9 g·cc$^{-1}$ |
| Original Structure | $\beta$-Ni(OH)$_2$ | $\beta$-Ni(OH)$_2$ |
| Structure after Activation | Uniform $\alpha$-Ni(OH)$_2$ | $\alpha/\beta$-Ni(OH)$_2$ core-shell |
| Half-cell Cycle Stability | >200 | 100 |
| BET Surface Area | 30.35 m$^2$·g$^{-1}$ | 51.97 m$^2$·g$^{-1}$ |
| Surface Pore Density | 0.016 cc·g$^{-1}$ | 0.027 cc·g$^{-1}$ |
| Average Pore Diameter | 24.6 Å | 24.6 Å |

The direct comparators illustrate that the WM12 material has a unique structure imparted by the presence of the different structures from a first material to a second material. Several additional materials were formed under conditions of the WM12 material and studied as provided above. Comparisons of structure and electrochemical performance are illustrated in Table 4.

TABLE 4

| | ICP atomic % | Capacity 0.9 V (mAh/g) | MidVoltage (V) | alpha-phase | Tri-electro Cycles | Tap Density |
|---|---|---|---|---|---|---|
| WM04 | $Ni_{81.5}Co_{5.4}Al_{13.1}$ | 245 | 1.19 | high | 16 | 1.25 |
| WM08 | $Ni_{77.1}Co_{5.2}Al_{11.6}Zn_{6.1}$ | 265 | 1.24 | 76% | 9 | 1.6 |
| WM09 | $Ni_{91.2}Co_{4.7}Al_{2.1}Y_{2.0}$ | 334 | 1.16 | 17% | 15 | 1.3 |
| WM11 | $Ni_{86.8}Co_{5.0}Al_{2.3}Y_{1.9}Nd_{2.0}$ | 325 | | 12% | 71+ | 1.3 |
| WM12 | $Ni_{86.4}Co_{11.5}Al_{2.1}$ | 374 | 1.18 | 23% | 17 | 0.9 |
| WM13 | $Ni_{83.6}Co_{12.1}Al_{2.4}Y_{1.9}$ | 205 | 1.19 | 10% | 6 | 1 |
| WM20 | $Ni_{83.1}Co_{12.4}Al_{4.5}$ | 301 | | 21% | 17+ | 1.2 |

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. An electrochemically active particle comprising:
   a first electrochemically active material; and
   a second electrochemically active material disposed about the first electrochemically active material, the second active material being the outermost material, the second electrochemically active material comprising single element modifier, the modifier present as a continuous transition concentration gradient from said first electrochemically active material into said second electrochemically active material wherein the first electrochemically active material and the second electrochemically active material form a solid solution throughout the electrochemically active particle, and the modifier concentration being lower in the first electrochemically active material than in the second electrochemically active material, and wherein the atomic percentage of constituent elements excluding the modifier of the first electrochemically active material and the second electrochemically active material differ by less than 20 atomic percent, wherein the first electrochemically active material and the second electrochemically active material comprise nickel as a metallic predominant.

2. The electrochemically active particle of claim 1 wherein the modifier is a metallic element, the metallic element different from all of said constituent elements.

3. The electrochemically active particle of claim 1 wherein metallic constituents of the first electrochemically active material and the second electrochemically active material are identical other than the presence of the modifier.

4. The electrochemically active particle of claim 1 wherein the modifier is selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

5. The electrochemically active particle of claim 1 wherein the atomic ratio of the modifier at the surface of the particle relative to the first electrochemically active material is from about 10:1 to about 1.2:1.

6. The electrochemically active particle of claim 1 wherein the first electrochemically active material and the second electrochemically active material comprise the constituent elements nickel and cobalt.

7. The electrochemically active particle of claim 1 wherein the particle has a BET surface area of 40 m$^2$/g or greater.

8. The electrochemically active particle of claim 1 wherein the second electrochemically active material comprises a plurality of surface pores extending from an outer most portion of the second electrochemically active material toward the first electrochemically active material.

9. The electrochemically active particle of claim 8 wherein the plurality of surface pores have an average pore diameter of less than 35 angstroms, optionally less than 25 angstroms.

10. The electrochemically active particle of claim 8 wherein the plurality of surface pores has a pore volume of 0.02 cc/g or greater, optionally 0.025 cc/g or greater.

11. The electrochemically active particle of claim 8 wherein a percentage of pores with a cross sectional dimension of 15 angstroms or less is 5 percent or greater.

12. A process of forming the electrochemically active particle of claim 1 in a single tank reactor comprising:
   simultaneously combining one or more metal salts with a conductive modifier and a solvent in a single reactor to form a combination, the modifier having a solubility lower than the metal salts in the solvent;
   agitating the combination; and
   adding a base to the combination to precipitate the electrochemically active particle.

13. The process of claim 12 wherein the pH is maintained at 9.0 to 10.7.

14. The process of claim 12 wherein the step of maintaining is by adding the base at a constant rate.

15. The process claim 14 wherein the base is NaOH or KOH.

16. The process of claim 14 wherein the base is added from a solution of 15% to 25% and at a rate of 3 cc/min or less.

17. The process of claim 12 further comprising adding ammonia to the reactor, the ammonia added at a molar ratio to salt of less than 7, optionally less than 2.

18. The process of claim 12 further comprising maintaining the temperature at 20° C. to 100° C.

19. The process of claim 12 wherein the metal salt and the conductive modifier are added to the reactor in from a single feed stream.

* * * * *